United States Patent [19]

Givens

[11] 4,378,498

[45] Mar. 29, 1983

[54] SIMULATION OF SUBSURFACE FORMATIONS FOR THE TESTING AND CALIBRATION OF RADIOACTIVE WELL LOGGING TOOLS

[75] Inventor: Wyatt W. Givens, Dallas, Tex.

[73] Assignee: Mobil Oil Corporation, New York, N.Y.

[21] Appl. No.: 194,739

[22] Filed: Oct. 7, 1980

[51] Int. Cl.³ .................. G01D 18/00; G01V 5/00
[52] U.S. Cl. .................. 250/252.1; 250/256
[58] Field of Search .............. 250/252, 253, 256, 259; 376/160

[56] References Cited

U.S. PATENT DOCUMENTS

| | | |
|---|---|---|
| 2,666,142 | 1/1954 | Herzog et al. . |
| 2,816,235 | 12/1957 | Scherbatskoy . |
| 2,945,129 | 7/1960 | Swift et al. . |
| 2,978,585 | 4/1961 | Rabson . |
| 3,213,279 | 10/1965 | Caldwell . |
| 3,215,837 | 11/1965 | Hall, Jr. et al. . |
| 4,119,847 | 10/1978 | Waggoner ............... 250/252 |
| 4,177,378 | 12/1979 | Stevens ................... 250/252 |

Primary Examiner—Alfred E. Smith
Assistant Examiner—Janice A. Howell
Attorney, Agent, or Firm—C. A. Huggett; M. G. Gilman; G. W. Hager

[57] ABSTRACT

A radioactive medium simulates a desired subsurface formation condition for the testing and calibration of radioactive well logging tools. The medium simulates a state of radioactive equilibrium in which the decay products of the parent isotope decay at a desired rate to that at which they are produced within the medium.

20 Claims, 2 Drawing Figures

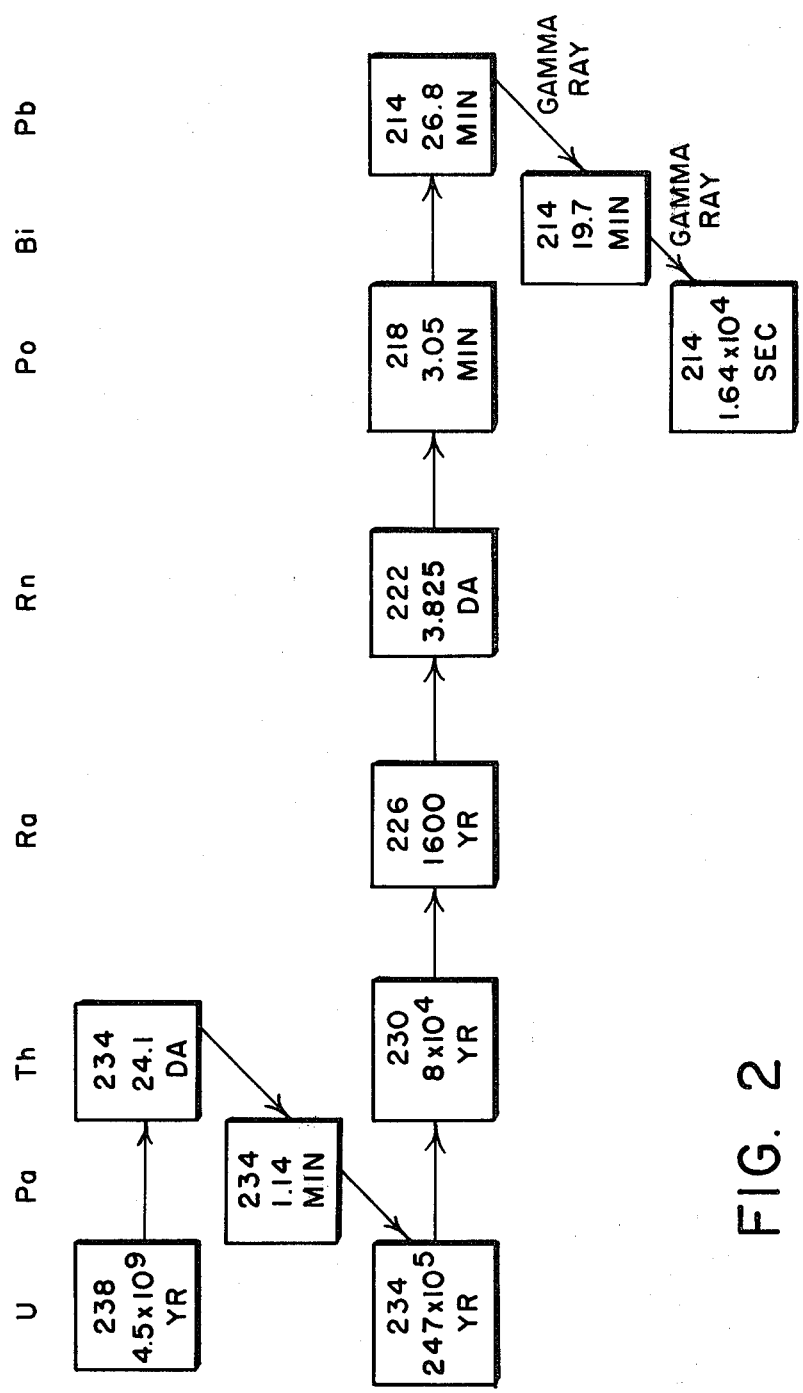
FIG. 2  DECAY SCHEME OF URANIUM-238

SIMULATION OF SUBSURFACE FORMATIONS FOR THE TESTING AND CALIBRATION OF RADIOACTIVE WELL LOGGING TOOLS

BACKGROUND OF THE INVENTION

This invention relates to radioactive logging and more particularly to a method for simulating the radioactive content of a subsurface formation for use in the testing and calibration of uranium assay logging tools employing prompt fission neutron detection, delayed fission neutron detection and gamma radiation detection.

A natural earth formation may be characterized by its state of radioactivity and more particularly with regard to its uranium content on the basis of prompt and delayed neutrons resulting from induced neutron fission of uranium. When a formation containing a uranium ore is irradiated with neutrons, a certain proportion of the uranium nuclei react to neutron bombardment by breaking into smaller nuclear fractions which normally are referred to as fission products. The fission of uranium is attended by the emission of prompt neutrons immediately upon occurrence of the fission reaction and also by the emission of delayed neutrons subsequent to the fission process. The delayed neutrons are emitted by the fission products for an appreciable length of time following the fission reaction.

U.S. Pat. No. 4,180,730 to Givens et al discloses a prompt fission uranium assaying operation which is carried out by locating in a borehole adjacent a formation of interest a logging tool which includes a source of fast neutrons, epithermal neutrons and thermal neutron detectors. The formation is irradiated with repetitive bursts of fast neutrons and subsequent to each burst and, after dissipation of the original source neutrons, prompt fission neutrons resulting from the thermal neutron fission of uranium-235 are detected. These prompt fission neutrons are produced and detected within a few tens of microseconds after each neutron burst from the source of fast neutrons.

U.S. Pat. No. 3,845,299 to Givens discloses a delayed fission uranium assaying operation carried out in similar manner to that described in the aforementioned patent to Givens excepting that subsequent to each burst of fast neutrons the delayed fission neutrons resulting from the neutron fission of uranium are detected. Those delayed fission neutrons are produced and detected in the order of a few milliseconds after each neutron burst from the source of fast neutrons.

As further noted in U.S. Pat. No. 3,845,299, it may be preferable to run a natural gamma radiation assay to identify those formations suspected of containing uranium and for which a neutron fission assaying operation should be carried out.

SUMMARY OF THE INVENTION

In accordance with the present invention, there is provided a method of simulating the radioactive content of a subsurface formation for use in the testing and calibration of a radioactive assay logging tool. In a specific feature of the invention, the medium containing the radioactive material includes sufficient radioactive parent and decay products to provide a desired state of radioactive equilibrium.

More particularly, refined or processed uranium, for example, is added to a medium representative of the condition of a subsurface formation. Radium is also added to the medium to achieve a state of radioactive equilibrium in which the uranium daughter products will decay at a rate which simulates a desired subsurface formation condition. A borehole logging tool to be tested and calibrated is exposed to the radioactive bearing medium and its response measured. The ratio of the neutron and gamma radiation measurements is utilized to provide a calibration function for the logging tool for the particular state of equilibrium of the radioactivity bearing medium.

BRIEF DESCRIPTION OF THE DRAWINGS

FIG. 2 depicts the radioactive decay scheme of uranium-238 leading to its gamma ray emitting daughters lead-214 and bismuth-214.

DESCRIPTION OF THE PREFERRED EMBODIMENTS

Figure 1:
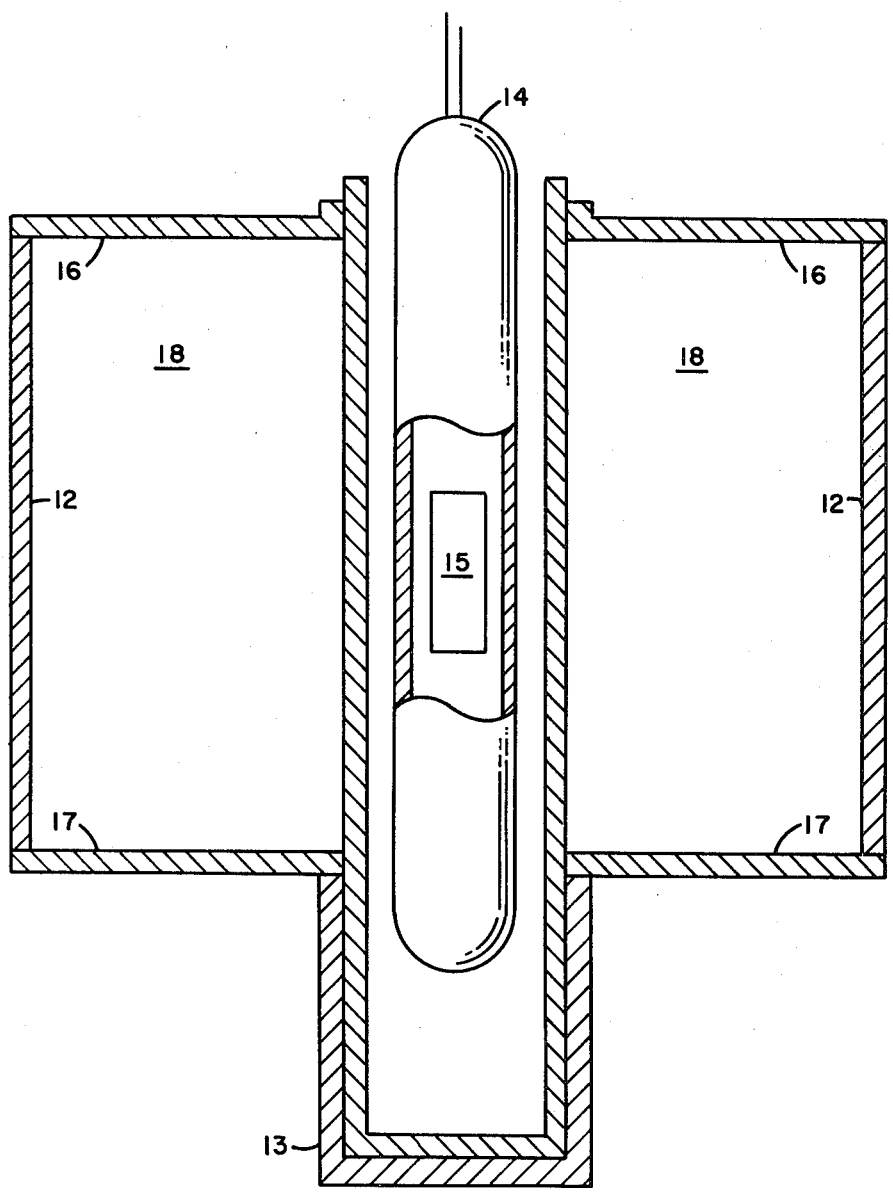
FIG. 1 illustrates a cross-sectional view of the calibration unit of the present invention having a logging tool inserted therein.

A standard practice for calibrating a uranium assay logging probe of the type described in the aforementioned U.S. Pat. Nos. 3,845,299 and 4,180,730 is to measure the response of the tool to a series of standards having known uranium ore grade concentrations. The particular ore grade for each standard and the corresponding tool response to such standard represents a coordinate point on a calibration function curve for such tool. The number of standards used in calibrations of the tool should be sufficient to give an accurate profile of the calibration function over the range of uranium ore grades that are likely to be encountered in an uranium assay operation.

Referring to FIG. 1 there is illustrated a calibration unit suitable for use as an uranium ore grade standard in the calibration or standardization of the uranium assay logging tool. The unit comprises a cylindrical liner 13 simulating a borehole and a cylindrical outer wall 12. The space between the liner 13 and the wall 12 is enclosed by top and bottom plates 16 and 17 respectively, thereby providing for the enclosed storage chamber 18. Such chamber is filled with an uranium bearing medium, preferably 20–40 mesh silica fracture sand saturated with a solution of water and soluble compounds of uranium and radium, for example, uranyl nitrate and radium bromide. The uranyl nitrate or other soluble uranium compound should contain uranium with a natural abundance of uranium isotopes, uranium-238 and uranium-235. The chamber 18 should be in the order of three feet high and three feet across so as to contain a sufficient amount of sand to present an infinite borehole appearance to an uranium assay logging tool 14 when inserted into the liner 13. This liner need only be sufficient in diameter to accept the logging tool 14 or to simulate the diameter of a borehole. However, in one particular embodiment liner 13 extends from the top member 16 beyond the lower member 17. Liner 11 thereby provides protection and support for a logging probe 14 that is greater in length than the height of the calibration unit itself. The liner is sufficiently long to permit logging tool 14 to be inserted to the point that the portion 15 of the tool containing the neutron source and the neutron or gamma ray detectors to be centrally located within the calibration unit and thereby maximize the simulation of the unit as an infinite subsurface medium. Liner 13 may comprise lucite or similar material while the outer wall 12 and the top and bottom members 16 and 17 are preferably comprised of stainless steel because of its resistance to rust and corrosion.

Having described the calibration unit of FIG. 1 in detail, there will now be described the method and procedure by which the ore grade concentration of the unit is determined. In the past such mediums contained refined uranium in which the decay products (i.e. daughters) of uranium-238 that emit the abundance of gamma rays associated with natural ore have been separated from the parent uranium. Referring to FIG. 2, it can be seen that due to the long half lives of some of the first uranium-238 daughters, nearly 250,000 years would be required to achieve an equilibrium concentration of the parent uranium-238 and the distant daughters bismuth-214 and lead-214 which emit the abundance of gamma-rays associated with a natural uranium ore. Consequently, a calibration unit having an uranium bearing medium comprising refined uranium is suitable for calibrating only fission neutron tools because of the few gamma rays emitted from the refined uranium.

It is, therefore, a specific feature of the present invention to provide for a uranium bearing medium which simulates as nearly as possible a natural uranium ore concentration to the logging tool being calibrated. This is accomplished in accordance with the present invention by producing a uranium bearing medium having a state of equilibrium in which the intermediate uranium daughters decay at the same rate as they are produced by the parent isotope. A radioactive series is in equilibrium when all the intermediate radioactive daughters are decaying at the same rate they are being produced by the parent isotope. For example, one curie ($3.7 \times 10^{10}$ disintegrations per second) of uranium-238 reaches equilibrium at the time one curie of each of the radioactive daughters is being produced. Equilibrium does not mean that there is an equal number of atoms of each element present but that the same number of atoms of each element decay each second. The time for a radioactive series to reach equilibrium is determined by the longest-lived radioactive daughters that are produced in the decay scheme. In the case of uranium-238 the daughter with the longest half-life is thorium-230 with a half-life of 80,000 years. In the refining process all daughters are separated from the parent uranium-238 except uranium-234 and the uranium-238 is not in equilibrium with its daughters. For refined uranium, near equilibrium would take place over a period of 250,000 to 500,000 years. Radium-226 is a daughter of uranium-238 and has a half-life of 1600 years. The longest lived daughter in the radium-226 decay scheme leading to the gamma ray emitting daughters bismuth-214 is less than thirty days.

In accordance with the present invention, apparent equilibrium of uranium-238 with its gamma ray emitting daughters bismuth-214 and lead-214 is achieved by adding the appropriate amount of radium-226 to the uranium bearing medium of the calibration unit. Such apparent equilibrium will be achieved in about thirty days. Since radium-226 has a half life of 1600 years, this apparent equilibrium between the parent uranium-238 and the gamma-ray emitting daughters lead-214 and bismuth-214 will persist for many decades.

The number of grams of uranium-238 to be added to the uranium bearing medium per gram of uranium-238 may be determined in accordance with the following:

---

Disintegrations per second (dps) per gram of uranium 238:

$$dps/gm(U\text{-}238) = \frac{NXY}{A}$$

where, $N$ = Avogadros Number ($6.02 + 10^{23}$)
$A$ = atomic weight of U-238 (238.07 grams)
$X$ = decay constant of U-238 = $\frac{L_n 2}{\text{half-life}}$ =

$$\frac{0.6931}{4.468 \times 10^{-9} \text{ years}} = 4.916 \times 10^{-18} \text{ sec}^{-1}$$

$Y$ = amount of U-238 in natural uranium (99.2746%)
therefore, dps/gm(U-238) = $0.1234 \times 10^5$
Disintegrations per gram (dps) of radium-226:

$$dps/gm(Ra\text{-}226) = \frac{NX}{A}$$

where, $N$ = Avogadros Number ($6.02 \times 10^{-23}$)
$A$ = atomic weight of RA-226 (226.05 grams)
$X$ = decay constant of Ra-226 =

$$\frac{L_n 2}{\text{half-life}} = \frac{0.6931}{1600 \text{ years}} = 1.373 \times 10^{-11} \text{ sec}^{-1}$$

therefore, dps/gm(Ra-226) = $3.656 \times 10^{10}$
Grams RA-226 per gram U-238 for equilibrium:

$$\frac{dps/gm(U\text{-}238)}{dps/gm(Ra\text{-}226)} = \frac{0.1234 \times 10^5}{3.656 \cdot 10^{10}} = 3.376 \times 10^{-7}$$

---

In view of the foregoing, the uranium bearing mixture can be made to appear to be in a state of equilibrium by mixing $3.376 \times 10^{-7}$ grams of radium-226 for each gram of refined uranium-238 in uranium with natural abundances of uranium-238 (99.28%) and uranium-235 (0.72%).

Notwithstanding the foregoing, natural uranium-238 is not always in a state of equilibrium. The parent uranium-238 and its gamma ray emitting daughters are sometimes separated by natural geochemical processes. For an equilibrium state, the neutron detector and gamma ray detector of properly calibrated neutron fission and gamma ray logging tools, respectively, should yield measurements of identical ore grades. However, with the parent uranium-238 separated from its daughters, such probes will yield measurements of differing ore grades. Under this condition, the uranium ore is recognized as being in a state of disequilibrium. The disequilibrium ratio is the elemental ore grade divided by the apparent gamma ray ore grade. In nature this ratio would be unity for an equilibrium state, less than unity for an excess of gamma ray emitting daughters, and greater than unity for an excess of the parent uranium. In nature the disequilibrium ratio is an important lithological parameter. For example a disequilibrium ratio of less than unity generally indicates an oxidized environment and a disequilibrium ratio greater than unity is generally indicative of a reduced environment.

Consequently, there may be times when it is desirable to provide a uranium bearing medium for a particular calibration unit that simulates a chosen degree of disequilibrium between the parent uranium and its gamma ray emitting daughters. This can be accomplished by varying the amount of radium-226 that is added to the refined uranium.

It is to be understood that various modifications to the disclosed embodiment, as well as alternative embodiments, may become apparent to one skilled in the art without departing from the scope and spirit of the invention as hereinafter defined by the appended claims.

What is claimed is:

1. A method of testing a uranium assay logging tool, comprising the steps of;

(a) providing a refined uranium bearing medium of suitable thickness to simulate the condition of the uranium content of a subsurface formation, (b) adding radium to said medium to achieve a desired state of apparent radioactive equilibrium between said refined uranium and its decay products lead and bismuth which emit the abundance of gamma-rays associated with a natural uranium ore, (c) exposing said logging tool to the radioactive radiation of the medium, and (d) measuring the response of said logging tool to said radioactive radiation from said medium.

2. The method of claim 1 wherein the amount of radium added to said uranium bearing medium provides a state of apparent equilibrium in which said decay products of the parent uranium content of said medium are decaying at substantially the same rate of that at which they are being produced by said medium.

3. The method of claim 1 wherein the amount of radium added to said uranium bearing medium provides a state of apparent equilibrium in which said decay products of the parent uranium content of said medium are decaying at a rate in excess of that at which they are being produced.

4. The method of claim 1 wherein the amount of radium added to said uranium bearing medium provides a state of apparent equilibrium in which said decay products of the parent uranium content of said medium are decaying at a rate less than that at which they are being produced.

5. The method of claim 1 wherein the amount of radium added to said uranium bearing medium is sufficient to permit the neutron and gamma ray measurements of said logging tool to be representative of substantially the same ore grade.

6. A method of testing a borehole logging tool adapted to respond to the uranium content of the subsurface formations surrounding a borehole, comprising the steps of:

(a) exposing said borehole logging tool to a uranium bearing medium of suitable thickness to simulate a subsurface condition surrounding a borehole in which a uranium parent and its decay products, lead and bismuth, are in a desired state of apparent radioactive equilibrium, and (b) measuring the response of said borehole logging tool to said medium.

7. The method of claim 6 wherein said radioactive parent is refined uranium.

8. The method of claim 7 wherein radium is added to said uranium bearing medium.

9. The method of claim 8 wherein the weight ratio of uranium to radium is unity.

10. The method of claim 8 wherein the weight ratio of uranium to radium is less than unity.

11. The method of claim 8 wherein the weight ratio of uranium to radium is greater than unity.

12. A method of simulating the radioactivity condition of a subsurface formation surrounding a borehole, comprising the steps of:

(a) adding refined uranium to a medium of suitable thickness to simulate the condition of a subsurface formation, and (b) adding radium to said medium to achieve a desired state of apparent radioactive equilibrium in which the end decay products of the parent uranium content of said medium are decaying at a desired rate relative to that at which they are being produced within said medium.

13. The method of claim 12 wherein said uranium is a soluble compound.

14. The method of claim 12 wherein said uranium is a uranyl nitrate.

15. The method of claim 12 wherein said uranium contains natural abundance of uranium-238 isotopes.

16. The method of claim 12 wherein said uranium contains natural abundance of uranium-235 isotopes.

17. The method of claim 12 wherein said radium is a soluble compound.

18. The method of claim 12 wherein said radium is a radium bromide.

19. The method of claim 12 wherein said radium contains radium-226 isotopes.

20. The method of claim 12 wherein said end decay products are bismuth and lead.

* * * * *